US 8,060,629 B2

(12) United States Patent
Krawetz

(10) Patent No.: US 8,060,629 B2
(45) Date of Patent: Nov. 15, 2011

(54) SYSTEM AND METHOD FOR MANAGING INFORMATION REQUESTS

(75) Inventor: Neal A. Krawetz, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2448 days.

(21) Appl. No.: 10/159,093

(22) Filed: May 30, 2002

(65) Prior Publication Data

US 2003/0225897 A1   Dec. 4, 2003

(51) Int. Cl.
*G06F 15/16* (2006.01)

(52) U.S. Cl. ........ 709/229; 709/231; 713/161; 713/162; 713/176

(58) Field of Classification Search .......... 709/223, 709/224, 227, 229, 249, 231; 713/162, 176, 713/201, 161

See application file for complete search history.

(56) References Cited

U.S. PATENT DOCUMENTS

| 5,680,461 | A  | * | 10/1997 | McManis ................. 713/162 |
| 5,884,025 | A  | * | 3/1999  | Baehr et al. ............ 713/201 |
| 6,604,143 | B1 | * | 8/2003  | Nagar et al. ............ 709/229 |
| 2002/0107971 | A1 | * | 8/2002 | Bailey et al. ........... 709/231 |
| 2003/0051142 | A1 | * | 3/2003 | Hidalgo et al. ......... 713/176 |

* cited by examiner

*Primary Examiner* — Yves Dalencourt

(57) ABSTRACT

A system for managing information requests a header data library accessible by a processor. The system also comprises a security module accessible by the processor. The security module is adapted to receive a request for information from a client where the request comprises header data and direct the request to a server if the request header data corresponds to the library header data.

31 Claims, 3 Drawing Sheets

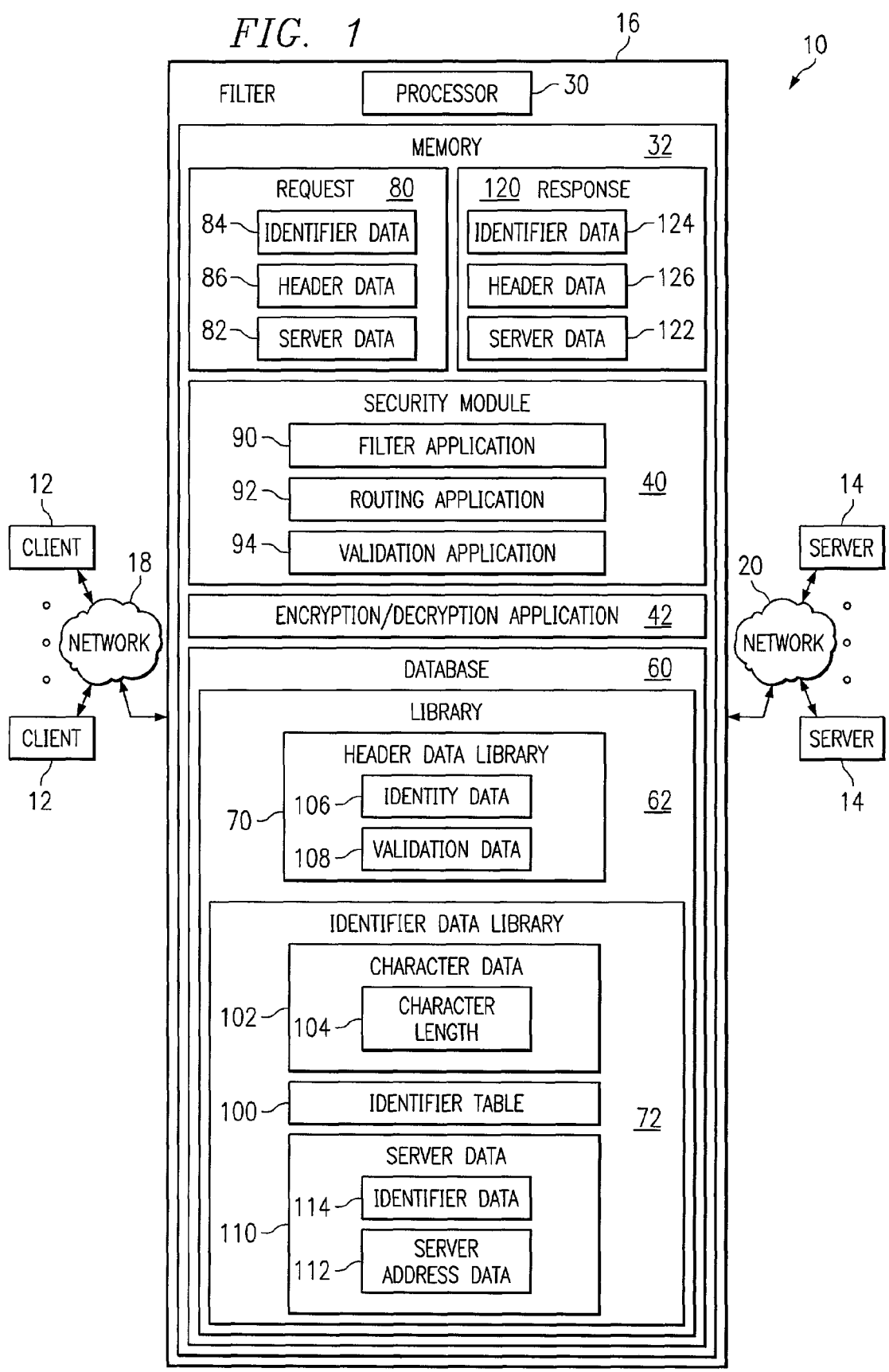

SYSTEM AND METHOD FOR MANAGING INFORMATION REQUESTS

TECHNICAL FIELD OF THE INVENTION

The present invention relates generally to the field of data communications and, more particularly, to a system and method for managing information requests.

BACKGROUND OF THE INVENTION

Web servers generally contain relatively large amounts of information, some of which may be of a confidential or sensitive nature. For example, web servers may contain financial, personal, and other types of sensitive or confidential information. Therefore, maintaining the security of the web server from unauthorized access is an important measure for both individuals and entities hosting the web services as well as individuals or entities storing information on the web server.

One method of protecting the web server includes a firewall. Firewalls generally prevent unauthorized access to various portions of the web server. However, even with active firewalls in place, servers may remain susceptible to unauthorized access. For example, servers may remain susceptible to buffer overflows, format bugs, parser problems or irregularities, unauthorized access to restricted areas, and other various attack methods.

SUMMARY OF THE INVENTION

In accordance with one embodiment of the present invention, a method for managing information requests comprises receiving a request for information comprising header data from a client at a filter and comparing the request header data to library header data. The method further comprises directing the request from the filter to a server if the request header data corresponds to the library header data.

In accordance with another embodiment of the present invention, a system for managing information requests comprises a header data library accessible by a processor. The system also comprises a security module accessible by the processor. The security module is adapted to receive a request for information from a client, the request comprising header data, and direct the request to a server if the request header data corresponds to the library header data.

In accordance with yet another embodiment of the present invention, a method for managing information requests comprises receiving a request for information from a client, the request comprising header data. The method also comprises comparing the request header data to a header data library, removing portions of the request header data not corresponding to the header data library, and directing the request to a server.

BRIEF DESCRIPTION OF THE DRAWINGS

For a more complete understanding of the present invention and the advantages thereof, reference is now made to the following descriptions taken in connection with the accompanying drawings in which:

FIG. 1 is a diagram illustrating a system for managing information requests in accordance with an embodiment of the present invention.

DETAILED DESCRIPTION OF THE DRAWINGS

Figure 2A:
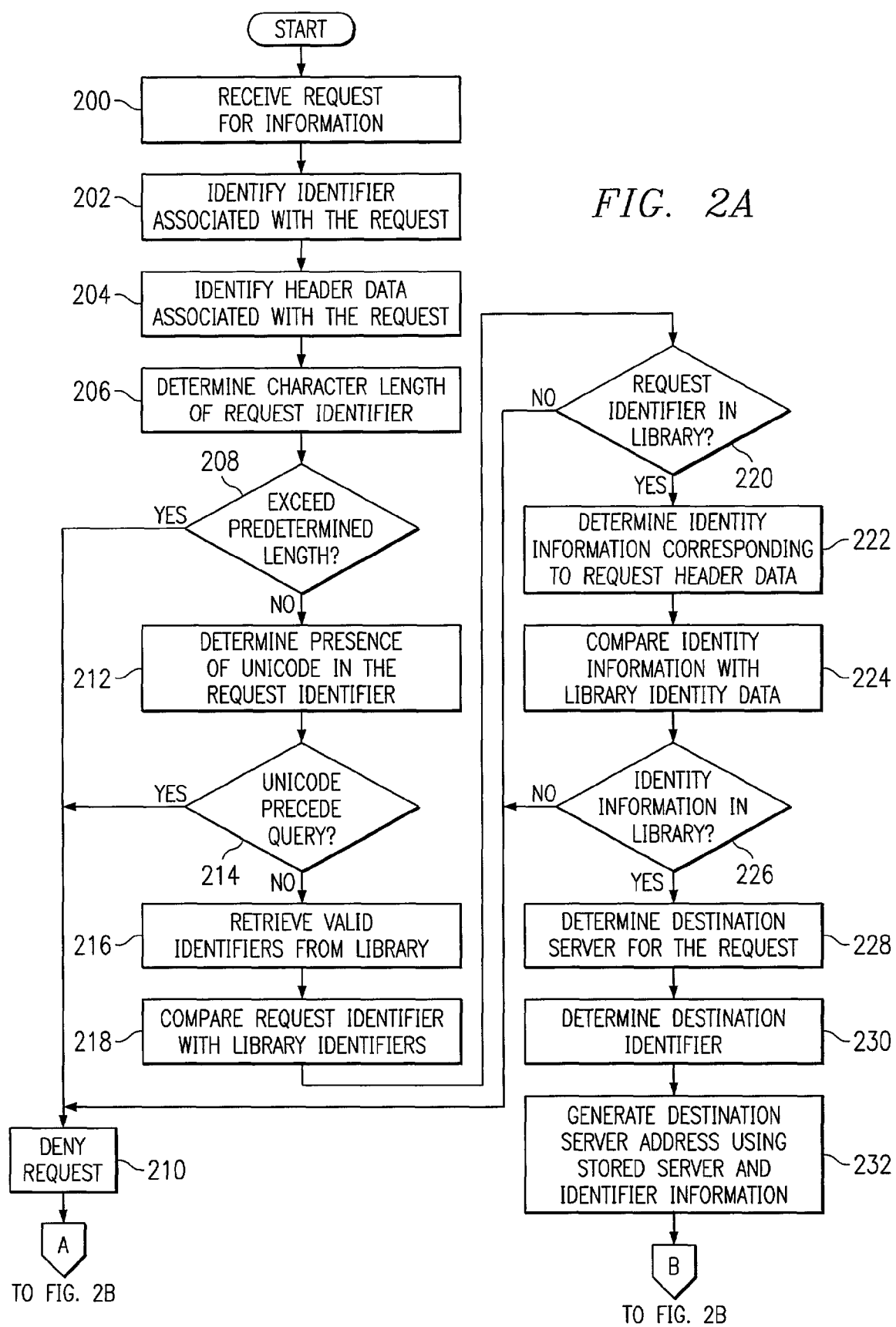
FIGS. 2A and 2B are a flow chart illustrating a method for managing information requests in accordance with an embodiment of the present invention.

The preferred embodiments of the present invention and the advantages thereof are best understood by referring to FIGS. 1 and 2 of the drawings, like numerals being used for like and corresponding parts of the various drawings.

Briefly, embodiments of the present invention provide a web server filter for screening and/or filtering web page requests prior to transmitting such requests to a designated back-end server. Embodiments of the present invention evaluate the request and denies transmitting the request to the back-end server if the request contains information that may introduce unknown variables to the back-end server or contains information indicative of potential unauthorized access to the back-end server. For example, the filter evaluates the server address, the uniform resource identifier, and various header field information associated with the request before transmitting the request to the back-end server. Embodiments of the present invention also modify or re-write the server address and/or uniform resource identifier corresponding to a particular back-end server, thereby hiding or shielding information associated with the back-end server. Embodiments of the present invention also filter the header field information associated with the request before transmitting the request to the back-end server, thereby preventing unnecessary and/or unknown header field information from being transmitted to the back-end server.

FIG. 1 is a diagram illustrating a system 10 for managing information requests in accordance with an embodiment of the present invention. In the illustrated embodiment, information requests are communicated between one or more clients 12 and one or more servers 14 via a filter 16. Filter 16 may be configured as a front-end server application or component, thereby resulting in a back-end configuration of servers 14; however, configurations of filter 16 and servers 14 may be otherwise varied. In the illustrated embodiment, clients 12 and servers 14 communicate with filter 16 via communication networks 18 and 20, respectively. Communication networks 18 and 20 way each comprise the Internet, a local area network, a wide area network, or other type of communication medium for transmitting information between filter 16 and clients 12 and servers 14. Clients 12 may comprise a desktop computer, personal digital assistant, or other computer or processing device incorporating a web browser or other type of interface for communicating with filter 16 via communication network 18. Clients 12 may also comprise other servers communicating with servers 14 via filter 16.

In the illustrated embodiment, filter 16 comprises a processor 30 coupled to a memory 32. The present invention also encompasses computer software that may be stored in memory 32 and executed by processor 30. In this embodiment, filter 16 comprises a security module 40 and an encryption/decryption application 42, which are computer software programs. In FIG. 1, security module 40 and encryption/decryption application 42 are illustrated as being stored in memory 32, where they can be executed by processor 30. However, module 40 and application 42 may be otherwise stored to be accessible by processor 30. Briefly, security module 40 is used to filter requests for information received from clients 12 before directing or forwarding such information requests to one or more servers 14. Encryption/decryption application 42 is used to encrypt or decrypt information communicated between clients 12 and servers 14.

In the illustrated embodiment, filter 16 also comprises a database 60. In this embodiment, database 60 has a library 62 comprising information associated with filtering the information requests received from clients 12. For example, in the illustrated embodiment, library 62 comprises a header data library 70 and a uniform resource identifier library 72. Briefly, the information requests received by filter 16 are compared with information contained in libraries 70 and 72 to protect servers 14 from unauthorized access and protect servers 14 from receiving extraneous information associated with the requests which may introduce unwanted variables into servers 14.

In operation, for example, clients 12 may comprise a web browser or other suitable interface for generating and transmitting information requests, such as web page requests, to filter 16 via network 18. Filter 16 stores the information received from clients 12 as a request 80 in memory 32. In the case of a web page request 80, information received from clients 12 may comprise a uniform resource locator (URL) defining a language protocol, server address, server port, and a uniform resource identifier (URI). Client 12 may also generate header information associated with requests 80, such as, but not limited to, field:value information pairs and other information or text associated with request 80. Accordingly, in the illustrated embodiment, request 80 comprises server address data 82 with address information associated with a client 12-requested destination server 14, uniform resource identifier data 84 comprising information associated with a client 12-requested URI, and header data 86 comprising information associated with the corresponding header fields of request 80.

In accordance with an embodiment of the present invention, security module 40 evaluates request 80 using information contained in library 62 and either denies request 80, thereby declining to forward request 80 to one of servers 14, or filters request 80 and forwards all or a portion of request 80 to one or more of servers 14. For example, in the illustrated embodiment, security module 40 comprises a filter application 90, a routing application 92, and a validation application 94, which are computer software programs.

Validation application 94 evaluates identifier data 84 of request 80 and determines whether identifier data 84 corresponds with information contained in identifier data library 72. For example, in the illustrated embodiment, identifier data library 72 comprises a uniform resource identifier table 100. Identifier table 100 comprises a listing a uniform resource identifiers corresponding to servers 14. In operation, validation application 94 compares identifier data 84 with the information contained in identifier table 100. If validation application 94 determines that identifier data 84 associated with request 80 comprises a uniform resource identifier not corresponding to information contained in identifier table 100, validation application 94 denies request 80. Accordingly, invalid uniform resource identifiers associated with request 80 are rejected to substantially prevent or eliminate unauthorized access to servers 14.

In the illustrated embodiment, identifier data library 72 also comprises character data 102. Character data 102 comprises criteria for evaluating a character string of a uniform resource identifier as defined by identifier data 84 of request 80. For example, character data 102 may comprise criteria such as determining whether identifier data 84 comprises a uniform resource identifier having unicode disposed before a query identifier. If the uniform resource identifier defined by identifier data 84 contains unicode disposed before a query identifier, validation application 94 rejects request 80. Accordingly, embodiments of the present invention substantially prevent or eliminate unauthorized access to servers 14 by evaluating a character string of request 80 for the presence of unicode.

In the illustrated embodiment, identifier data library 72 also comprises character string length data 104. Character string length data 104 comprises criteria associated with acceptable character string lengths of a uniform resource identifier as defined by identifier data 84. For example, data 104 may define a predetermined acceptable character string length for uniform resource identifiers defined by identifier data 84. Data 104 may define a minimum and/or maximum character string length such that if a uniform resource identifier defined by identifier data 84 comprises a character string length exceeding a character string length criteria as defined by data 104, validation application 94 denies request 80. Therefore, validation application 94 substantially prevents or eliminates uniform resource identifier overflows or underflows from being forwarded to servers 14.

Filter application 90 evaluates the header field information as defined by header data 86 and determines whether request 80 should be forwarded to one of servers 14. For example, in the illustrated embodiment, header data 70 comprises identity data 106. Identity data 106 comprises information associated with the identity of either client 12 or a user of client 12. For example, identity data 106 may comprise information associated with an IP address of client 12 or information corresponding to a particular user of client 12 which such user may have input into client 12. Thus, in operation, filter application 90 compares header field information as defined by header data 86 with identity data 106 and directs request 80 to one of servers 14 if header data 86 corresponds to identity data 106. For example, identity data 106 may comprise a listing of particular users of clients 12 that are to be directed to a particular server 14, such as a beta server 14. Accordingly, in this example, if the header field information defined by identifier data 84 corresponds to the listing of beta testers in identity data 106, request 80 is directed to the corresponding server 14.

Filter application 90 also determines which header fields of header data 86 should be forwarded to a corresponding server 14. For example, in the illustrated embodiment, header data library 70 also comprises validation data 108. Validation data 108 comprises information associated valid header fields corresponding to servers 14. In operation, filter application 90 reviews header data 86 and removes header fields defined by header data 86 not required or corresponding to servers 14 before forwarding request 80 to one of servers 14. Thus, in operation, filter application 90 substantially prevents or eliminates unwanted header field information from being forwarded to servers 14, thereby reducing or substantially eliminating the likelihood that unwanted environmental variables will be introduced to servers 14.

Filter application 90 may also modify header data 86 or add information to header data 86 before forwarding request 80 to one of servers 14. For example, validation data 108 may also comprise information associated with relating various header field:value pairs with header data 86 such that in response to receiving request 80, one or more field:value pairs or other types of header information may be added to header data 86 or field:value pairs of header data 86 may be replaced with other field:value pairs defined by data 108. Thus, a field:value pair corresponding to an address of client 12, security module information, or other header information variables may be added or modified before forwarding request 80 to client 12. Additionally, filter application 90 may also modify or add header information to a response from one of servers 14 before forwarding the response to request 80 to client 12.

Routing application 92 determines a desired destination server based on request 80 and modifies a server address of request 80 corresponding to a particular server 14. For example, in the illustrated embodiment, library 62 comprises server data 110. Server data 110 comprises information associated with each of servers 14. For example, in this embodiment, server data 110 comprises server address data 112. Server address data 112 may comprise a relational data listing of server addresses that may be received from clients 12 and server addresses and ports of servers 14. Thus, in operation, routing application 92 retrieves server data 82 corresponding to request 80 and compares server data 82 to server address data 112 to obtain a particular address and port to direct the request 80. Accordingly, routing application 92 modifies or re-writes the server data 82 to a server address as defined by server address data 112, thereby shielding or hiding the internal structure of servers 14.

In the illustrated embodiment, server data 110 also comprises server uniform resource identifier data 114. Data 114 comprises information associated with uniform resource identifiers corresponding to servers 14. For example, data 114 may comprise a relational table correlating uniform resource identifiers as defined by identifier data 84 to uniform resource identifiers corresponding to servers 14. Thus, in operation, routing application 92 reviews identifier data 84 corresponding to request 80 and compares uniform resource identifier information as defined by identifier data 84 with data 114. Routing application 92 modifies or re-writes the uniform resource identifier information as defined by identifier data 84 to a uniform resource identifier as defined by data 114. Thus, the present invention hides internal structures corresponding to servers 14 to substantially prevent or eliminate unauthorized access to servers 14.

Filter application 90 may also determine whether a particular uniform resource identifier of server 14 is associated with particular header information requirements before forwarding request 80 to server 14. For example, each uniform resource identifier may be associated with particular header information requirements such that for a particular uniform resource identifier of request 80, filter application 90 determines whether header data 86 associated with request 80 corresponds to the particular header information requirements. In this embodiment, header data library 70 may comprise links to external systems for acceptance or denial of request 80. Thus, for a particular uniform resource identifier corresponding to request 80, filter application 90 may screen header data 86 of request 80 to determine whether header data 86 corresponds to the particular uniform resource identifier.

Encryption/decryption application 42 is used to decrypt information associated with request 80 if portions of request 80 are in an encrypted format. Encryption/decryption application 42 may be configured to contact a remote host (not explicitly shown) for obtaining decoding information associated with the encrypted information of request 80. After decryption of any encrypted information associated with request 80, request 80 may be forwarded to a designated server 14.

After servers 14 receive and process information corresponding to request 80, a response 120 corresponding to request 80 is received by filter 16 from a corresponding server 14. As described above, response 120 may comprise server data 122, identifier data 124, and header data 126. Server data 122 may comprise information associated with a server address of the particular server 14. Identifier data 124 may comprise information associated with uniform resource identifiers of servers 14. Header data 126 may comprise information associated with header fields received from servers 14, such as field:value pairs.

After filter 16 receives response 120, filter application 90 reviews header data 126 and removes portions of header data 126 not required to be transmitted to client 12. For example, various header fields associated with response 120 may include information unnecessary to reply to request 80. Thus, filter application 90 removes portions of header data 126 to shield or hide internal structures corresponding to servers 14 from being transmitted to client 12. Additionally, filter application 90 also removes portions of identifier data 124 corresponding to servers 14 to shield information associated with uniform resource identifiers corresponding to servers 14 from being transmitted to clients 12. Encryption/decryption application 42 may also be used to encrypt information of response 120 prior to transmitting response 120 to clients 12.

Figure 2B:
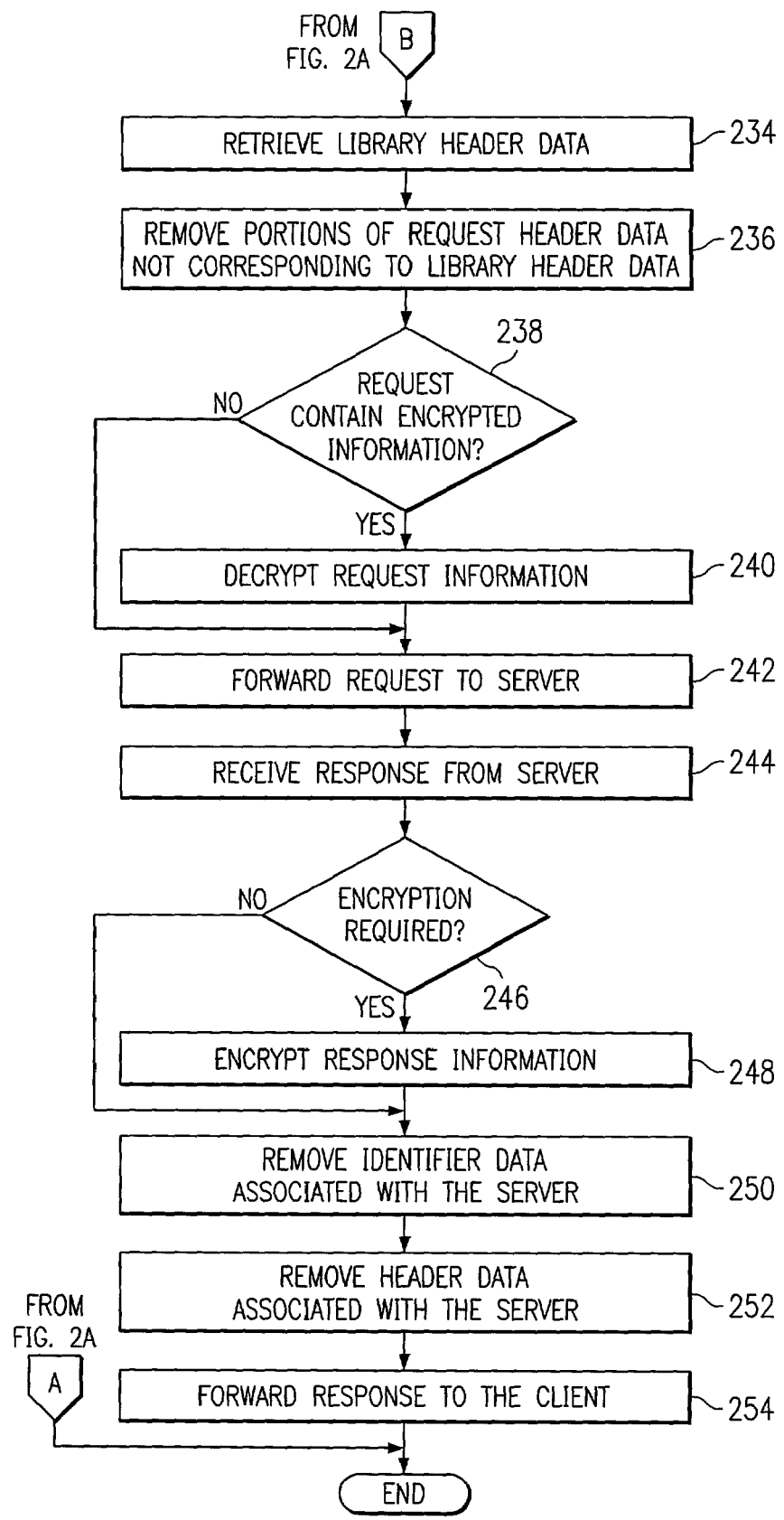

FIGS. 2A and 2B are a flow chart illustrating a method for managing information requests in accordance with an embodiment of the present invention. The method begins at step 200, where filter 16 receives request 80 from client 12. At step 202, security module 40 identifies identifier data 84 corresponding to request 80. For example, as described above, security module 40 identifies uniform resource identifiers of request 80. At step 204, security module 40 identifies header data 86 corresponding to request 80, such as, but not limited to, header field information associated with request 80.

At step 206, security module 40 determines a character string length corresponding to a uniform resource identifier as defined by identifier data 84 and compares the character string length to the character string length data 104. At decisional step 208, a determination is made whether the character string length of identifier data 84 exceeds the character string length data 104. If the character string length exceeds character string length data 104, the method proceeds from step 208 to step 210, where security module 40 denies forwarding of request 80 to servers 14. If the character string length associated with identifier data 84 does not exceed character string length data 104, the method proceeds from step 208 to step 212.

At step 212, security module 40 determines whether identifier data 84 contains unicode disposed before a query identifier. At decisional step 214, if identifier data 84 contains unicode disposed before a query identifier, the method proceeds from step 214 to step 210, where security module 40 denies forwarding of request 80 to servers 14. If identifier data 84 does not contain unicode disposed before a query identifier, the method proceeds from step 214 to step 216.

At step 216, security module 40 retrieves a listing of valid uniform resource identifiers corresponding to servers 14 from identifier table 100. At step 218, security module 40 compares identifier data 84 with uniform resource identifier information contained in identifier table 100. At decisional step 220, a determination is made whether identifier data 84 corresponds to uniform resource identifier information contained in identifier table 100. If identifier data 84 does not correspond with uniform resource identifier information contained in identifier table 100, the method proceeds from step 220 to step 210, where security module 40 denies forwarding of request 80 to servers 14. If identifier data 84 corresponds with information contained in identifier table 100, the method proceeds from step 220 to step 222.

At step 222, security module 40 reviews header data 86 to determine whether header data 86 contains information associated with an identity of a particular client 12 or a user of a particular client 12. At step 224, security module 40 compares the identity information of header data 86 to identity data 106 stored in library 70. At decisional step 226, a determination is made whether the identity information corresponding to header data 86 corresponds to identity data 106. If the header data 86 does not correspond to the identity data 106, the method proceeds from step 226 to step 210, where security module 40 denies forwarding of request 80 to servers 14. If identity information corresponding to header data 86 corresponds with identity data 106, the method proceeds from step 226 to step 228.

At step 228, security module 40 determines one of servers 14 to receive request 80 based on server data 82. For example, security module 40 compares a server address as defined by server data 82 with server address data 112 to obtain a routing address corresponding to one of servers 14. At step 230, security module 40 determines a uniform resource identifier corresponding to server 14 based on identifier data 84. For example, security module 40 compares a uniform resource identifier as defined by identifier data 84 with data 114 to obtain a corresponding uniform resource identifier of server 14. At step 232, security module 40 generates a uniform resource locator corresponding to request 80 using information obtained in steps 228 and 230, for example, the server address and uniform resource identifier corresponding to a particular server 14.

At step 235, security module 40 retrieves validation data 108. At step 236, security module 40 removes portions of header data 86 not corresponding to validation data 108 such that unnecessary header fields and other unknown header information is not forwarded to servers 14. At step 238, a determination is made whether information associated with request 80 requires decryption. If information associated with request 80 is encrypted, the method proceeds from step 238 to step 240, where encryption/decryption application 42 may decrypt such encrypted information. If information associated with request 80 does not require decryption, the method proceeds from step 238 to step 242.

At step 242, filter 16 forwards request 80 to a designated server 14. At step 244, filter 16 receives a response 120 from a particular server 14 corresponding to request 80. At decisional step 246, a determination is made whether information associated with response 120 requires encryption. If information associated with response 120 requires encryption, the method proceeds from step 246 to step 248, where encryption/decryption application 42 may be used to encrypt the information. If information associated with response 120 does not require encryption, the method proceeds from step 246 to step 250.

At step 250, security module 40 removes portions of identifier data 124 corresponding to response 120 from being transmitted to client 12. For example, various header fields response 120 may be removed to shield such information related to server 14 from being transmitted to client 12. At step 252, security module 40 removes portions of identifier data 124 corresponding to response 120. For example, security module 40 may remove information associated with a uniform resource identifier of server 14 such that such information is not transmitted to clients 12. At step 254, filter 16 forwards response 120 to client 12.

What is claimed is:

1. A method for managing information requests, comprising:
   receiving a request for information from a client at a filter, the request comprising header data;
   comparing the request header data to a plurality of filter criteria; and
   directing the request from the filter to a server if the request header data corresponds to at least two of the filter criteria.

2. The method of claim 1, wherein at least one of the filter criteria comprises information associated with a user of the client.

3. The method of claim 1, further comprising removing portions of the header data not corresponding to at least one of the filter criteria.

4. The method of claim 1, further comprising modifying a uniform resource identifier associated with the request to another uniform resource identifier corresponding to the server.

5. The method of claim 1, wherein directing further comprises directing the request to the server if a uniform resource identifier associated with the request corresponds to a uniform resource identifier stored in an identifier library.

6. The method of claim 1, further comprising denying the request if a uniform resource identifier associated with the request comprises unicode disposed before a query identifier.

7. The method of claim 1, further comprising denying the request if a character string length of a uniform resource identifier associated with the request exceeds a predetermined character string length.

8. The method of claim 1, further comprising modifying the request header data before directing the request to the server.

9. The method of claim 1, further comprising directing a response received by the filter from the server corresponding to the request to the client.

10. The method of claim 9, further comprising removing header data associated with the server from the response before directing the response to the client.

11. A system for managing information requests, comprising:
    a library accessible by a processor, the library comprising a plurality of filter criteria; and
    a security module accessible by the processor, the security module adapted to receive a request for information from a client, the request comprising header data, and direct the request to a server if the request header data corresponds to at least two of the filter criteria.

12. The system of claim 11, wherein at least one of the filter criteria comprises information associated with a user of the client.

13. The system of claim 11, wherein the security module is further adapted to remove portions of the request header data not corresponding to at least one of the filter criteria.

14. The system of claim 11, wherein the security module is further adapted to deny the request if a uniform resource identifier associated with the request comprises unicode disposed before a query identifier.

15. The system of claim 11, wherein the security module is further adapted to deny the request if a character string length of a uniform resource identifier associated with the request exceeds a predetermined character string length.

16. The system of claim 11, wherein the security module is further adapted to modify a uniform resource identifier associated with the request to a uniform resource identifier corresponding to the server.

17. The system of claim 11, wherein the security module is further adapted to modify the request header data before directing the request to the server.

18. A method for managing information requests, comprising:
    receiving a request for information from a client, the request comprising header data;
    comparing the request header data to a header data library;
    removing portions of the request header data not corresponding to the header data library; and
    directing the request to a server.

19. The method of claim 18, further comprising modifying a uniform resource identifier associated with the request to another uniform resource identifier corresponding to the server.

20. The method of claim 18, further comprising denying the request if a character string length of a uniform resource identifier associated with the request exceeds a predetermined character string length.

21. The method of claim 18, further comprising denying the request if a uniform resource identifier associated with the request comprises unicode disposed before a query identifier.

22. The method of claim 18, wherein directing further comprises directing the request to the server if a uniform resource identifier associated with the request corresponds to a uniform resource identifier stored in an identifier library.

23. The method of claim 18, further comprising directing a response received at the filter from the server corresponding to the request to the client.

24. The method of claim 23, further comprising removing header data associated with the server from the response before directing the response to the client.

25. A system for managing information requests, comprising:
    means for receiving a request for information from a client, the request comprising header data;
    means for comparing the header data to a plurality of filter criteria; and
    means for directing the request to a server if the request header data corresponds to at least two of the filter criteria.

26. The system of claim 25, further comprising means for removing a portion of the request header data not corresponding to at least one of the filter criteria.

27. The system of claim 25, further comprising means for denying the request if a uniform resource identifier associated with the request comprises unicode disposed before a query identifier.

28. The system of claim 25, further comprising means for denying the request if a character string length of a uniform resource identifier associated with the request exceeds a predetermined character string length.

29. The system of claim 25, further comprising means for modifying a uniform resource identifier associated with the request to a uniform resource identifier corresponding to the server.

30. The system of claim 25, further comprising means for removing header data associated with the server from a response to the request before directing the response to the client.

31. The system of claim 25, further comprising means for modifying the request header data before directing the request to the server.

* * * * *